Patented June 30, 1936

2,045,842

UNITED STATES PATENT OFFICE 2,045,842

HYDRATION OF OLEFINES

Henry Dreyfus, London, England

No Drawing. Application October 28, 1932, Serial No. 640,001. In Great Britain December 22, 1931

9 Claims. (Cl. 260—156)

This invention relates to the hydration of olefines and especially to the manufacture of ethyl alcohol by the hydration of ethylene.

I have found that ethylene may be hydrated in a very satisfactory manner by subjecting it to reaction with steam in the presence of aqueous solutions of acids, acid salts or other hydration catalysts under elevated temperatures, and especially aqueous solutions of non-volatile acids such as sulphuric acid, phosphoric acid or the like. Aqueous solutions of other acids or other hydration catalysts may, however, be employed particularly when such substances are substantially non-volatile under the conditions of reaction.

The reaction may be performed at temperatures upwards of about 100° C. and especially at temperatures between about 150° and 300° C. or more. Elevated pressures are very useful for accelerating the reaction; for example, pressures up to 15 to 25 atmospheres may be employed, although higher or considerably higher pressures may be employed if desired. The pressure should, of course, be sufficient to maintain the solutions in the liquid state at the temperature of the reaction, i. e. it should be sufficiently high to avoid excessive evaporation of the water of the solutions, and naturally the temperature employed should be below the critical temperature of the solutions.

For the purposes of the invention I employ preferably dilute or relatively dilute solutions of the acids or other hydration catalysts, and particularly solutions of up to about 20% or even 50% concentration. Solutions of between about 2% and 10% concentration are especially useful, particularly in the case of solutions of strong acids such as sulphuric or phosphoric acid, although solutions of higher concentrations may be employed, especially when hydration catalysts other than strong acids, for example acid salts, are to be used.

The solutions may, if desired, in addition to the acids or other hydration catalysts, contain metals, salts or other substances capable of promoting the absorption of ethylene, such as silver sulphate, calcium sulphate, lead sulphate, iron sulphate, ferrous ammonium sulphate, mercurous sulphate, silver or copper. Such substances may conveniently be employed in amount between about ½ to 4% of the solution although other proportions may be employed if desired.

The mixtures of ethylene and steam may be brought into contact with the catalytic solutions in any convenient way. Preferably they are passed in a stream continuously into contact with the solutions. For instance the process may be performed in a very satisfactory manner by passing the said mixtures in a stream through the heated solutions whereby the alcohol or ether formed may be caused to distil off continuously from the solutions. In such a process the concentration of the heated solutions may be maintained substantially constant or between any desired limits by any convenient means, as, for instance, by control of the relative proportions of the ethylene and steam in the gaseous mixture employed, or by control of the rate of flow of the ethylene and steam, by addition of liquid water, or in any other convenient way.

In another method of applying the invention the ethylene and steam mixture may be passed in counter-current to the catalytic solutions, for instance in towers or the like maintained at the desired temperatures and under the desired pressures.

The ethylene and steam may be present in the reaction mixtures in any convenient proportion, such as in equimolecular proportion. However, mixtures containing more than one molecule of ethylene to each molecule of steam are usually to be preferred particularly when the process is performed as a continuous operation, since the use of such proportions facilitates the maintenance of substantially constant concentration of the aqueous solutions of the acids or hydrating catalysts and avoids undue dilution of the alcohol and/or ether passing over from said solutions. If desired inert or diluent gases or vapours, such as nitrogen, may also be present.

If, instead of mixtures of ethylene and steam, mixtures of higher olefines and steam are employed, the corresponding higher alcohols and ethers can readily be obtained by means of the invention. Thus, for instance, isopropyl alcohol can readily be obtained if mixtures of propylene and steam are employed. If desired the mixtures may contain a plurality of olefines whether or not they contain ethylene and from such mixtures mixtures of alcohols and/or ethers can readily be obtained.

The following example illustrates the invention but is not to be considered as in any way limiting it.

*Example*

A mixture of approximately 3 volumes of ethylene and 2 volumes of water vapour is preheated to 150° C. and repeatedly circulated through a 10% solution of sulphuric acid, heated to a temperature of 200° C. and maintained under a pressure of 25 atmospheres under such conditions that the reaction mixture is in contact with the acid solution for a period of approximately 30 seconds or less during each cycle. The vapours leaving the reaction zone may be treated for the separation of ethyl alcohol in any convenient way, either after each passage through the catalyst, or after any number of such passages, and the ethylene remaining may be returned to the reaction zone, if desired, after admixture with further water vapour.

I wish it to be understood that by the term "water" I include water both in the liquid and vapour phase.

What I claim and desire to secure by Letters Patent is:—

1. A continuous process for the manufacture of hydration products of olefines which comprises continuously bringing an olefine mixed with steam into contact with an aqueous solution of a strong non-volatile acid of concentration between 2 and 10% at a temperature between 150 and 300° C. and under a pressure sufficient to maintain the acid concentration.

2. A continuous process for the manufacture of hydration products of ethylene which comprises continuously bringing ethylene mixed with steam into contact with an aqueous solution of a strong non-volatile acid of concentration between 2 and 10% at a temperature between 150 and 300° C. and under a pressure sufficient to maintain the acid concentration.

3. A continuous process for the manufacture of hydration products of olefines which comprises continuously bringing an olefine mixed with steam into contact with an aqueous solution of sulphuric acid of concentration between 2 and 10% at a temperature between 150 and 300° C. and under a pressure sufficient to maintain the acid concentration.

4. A continuous process for the manufacture of hydration products of ethylene which comprises continuously bringing ethylene mixed with steam into contact with an aqueous solution of sulphuric acid of concentration between 2 and 10% at a temperature between 150 and 300° C. and under a pressure sufficient to maintain the acid concentration.

5. A continuous process for the manufacture of hydration products of olefines which comprises continuously bringing an olefine mixed with steam into contact with an aqueous solution of phosphoric acid of concentration between 2 and 10% at a temperature between 150 and 300° C. and under a pressure sufficient to maintain the acid concentration.

6. A continuous process for the manufacture of hydration products of olefines which comprises continuously bringing an olefine mixed with steam into contact with an aqueous solution of a strong non-volatile acid of concentration between 2 and 10% at a temperature between 150 and 300° C. and under a pressure sufficient to maintain the acid concentration, said solution containing at least one substance capable of promoting the absorption of ethylene in acids and selected from the group consisting of silver sulphate, calcium sulphate, lead sulphate, iron sulphate, ferrous ammonium sulphate, mercurous sulphate, silver and copper.

7. A continuous process for the manufacture of hydration products of ethylene which comprises continuously bringing ethylene mixed with steam into contact with an aqueous solution of a strong non-volatile acid of concentration between 2 and 10% at a temperature between 150 and 300° C. and under a pressure sufficient to maintain the acid concentration, said solution containing at least one substance capable of promoting the absorption of ethylene in acids and selected from the group consisting of silver sulphate, calcium sulphate, lead sulphate, iron sulphate, ferrous ammonium sulphate, mercurous sulphate, silver and copper.

8. A continuous process for the manufacture of hydration products of ethylene which comprises continuously bringing ethylene mixed with steam into contact with an aqueous solution of sulphuric acid of concentration between 2 and 10% at a temperature between 150 and 300° C. and under a pressure sufficient to maintain the acid concentration, said solution containing at least one substance capable of promoting the absorption of ethylene in acids and selected from the group consisting of silver sulphate, calcium sulphate, lead sulphate, iron sulphate, ferrous ammonium sulphate, mercurous sulphate, silver and copper.

9. A continuous process for the manufacture of hydration products of ethylene which comprises continuously bringing ethylene mixed with steam into contact with an aqueous solution of phosphoric acid of concentration between 2 and 10% at a temperature between 150 and 300° C. and under a pressure sufficient to maintain the acid concentration, said solution containing at least one substance capable of promoting the absorption of ethylene in acids and selected from the group consisting of silver sulphate, calcium sulphate, lead sulphate, iron sulphate, ferrous ammonium sulphate, mercurous sulphate, silver and copper.

HENRY DREYFUS.